Figure 1:
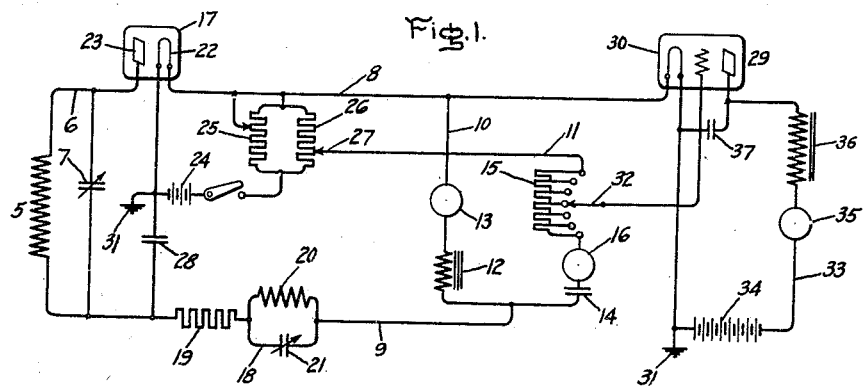

Aug. 25, 1931.   A. D. RING   1,820,833
TESTING INSTRUMENT FOR TRANSMITTERS
Filed Aug. 22, 1929

Inventor:
Andrew D. Ring,
by Charles E. Tullar
His Attorney.

Patented Aug. 25, 1931

1,820,833

UNITED STATES PATENT OFFICE

ANDREW D. RING, OF WASHINGTON, DISTRICT OF COLUMBIA, ASSIGNOR TO GENERAL ELECTRIC COMPANY, A CORPORATION OF NEW YORK

TESTING INSTRUMENT FOR TRANSMITTERS

Application filed August 22, 1929. Serial No. 387,738.

The present invention relates to a testing instrument for radio transmitting apparatus and the like and more particularly it relates to an instrument of this character which is adapted primarily for measuring the percentage modulation of a transmitter.

In adjusting a transmitter it is imperative that a means of measuring percentage modulation be available, so that the capability of the transmitters to handle high modulation and the capability of the modulators to produce suitable audio voltages be checked. In the operation of a transmitter a percentage modulation indication is necessary to adjust the input to the speech amplifier.

At present, oscilloscopes are used almost exclusively in test measurements of transmitter operation. A coil is coupled to the tank circuit of the transmitter, the picked-up current is rectified by means of a two-element vacuum tube and supplied to the vibrator coil of the oscilloscope. The beam is adjusted so that with no pick-up it strikes on 100% modulation, and the amount of pick-up is varied until with normal carrier and no modulation the beam strikes on zero modulation. When the carrier is modulated, the beam oscillates back and forth across the screen, producing an image which appears to be a solid straight line. The length of this line compared with the length of the line with no modulation on is proportional to the envelope of the carrier voltage and therefore indicates percentage of modulation.

For laboratory use the oscillograph is indispensable. It has many applications and is quite accurate but there are several objections to its use in broadcasting stations and field work. There are four characteristics that are ordinarily taken in operating and adjusting a transmitter. (1) Monitoring or measuring the per cent modulation is considered to be the most important. (2) The overall frequency characteristic and (3) amplitude characteristic measurements are also important. (4) The carrier changes during modulation are important in making complete adjustments on a transmitter.

In obtaining the overall frequency characteristic, as is well known, the input, or modulation frequency at a constant voltage is varied, and the percentage modulation of the transmitter is observed, and for correct operation this frequency variation should not affect the per cent modulation. Likewise, in obtaining the amplitude characteristic of a transmitter, the percentage modulation is observed, while the input or modulation voltage is varied at a constant frequency. For correct operation the percentage modulation plotted against the input voltage should be a straight line.

The oscillograph cannot be used for taking frequency characteristics as the vibrating element will not respond to the high frequency. For monitoring there are several objections to the oscillograph. First, it is difficult to read during rapid modulation and experienced operators seldom read the modulation correctly without special effort. It cannot be read except in one position of the head. The instrument is delicate and if the vibrating element becomes defective it requires considerable experience to repair it. Next, the oscilloscope is not similar to any of the standard equipment and is difficult to mount. For amplitude characteristics it can only be used at low frequency (1000 cycles or below).

The object of this invention is to provide an improved testing instrument for measuring the operating characteristic of a radio transmitter and particularly the percent modulation. A further object of this invention is to provide a testing instrument for radio transmitters which is adapted for use in a broadcasting station and in the field, and which may be provided as a unit in the panel equipment of a station.

All of the required tests for a transmitter may be made with the modulation indicator of the present invention. It is well suited for measuring the per cent modulation, frequency characteristics, amplitude characteristics and changes in the carrier during modulation. For monitoring it operates in the same manner as a volume indicator in a studio control room, in fact, it may be calibrated in transmission units (TU) or decibels (db) so that it agrees exactly with the control room measuring devices. For amplitude and frequency characteristics the one can be plotted directly against the other. For percent modulation a correction curve is used. This calibration is determined by the constants of the device and need not be calibrated in a laboratory. The transmission unit above mentioned will hereinafter be referred to by the letters TU although as is well understood the abbreviation or symbol *db* could be used as well. The number of TU corresponding to the ratio of any two powers is 10 times the logarithm of that ratio as is well known.

The invention will be better understood from the following description when considered in connection with the accompanying drawings and its scope will be pointed out in the appended claims.

Figure 2:
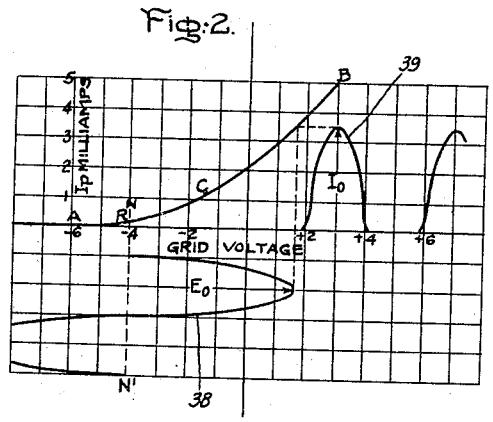
Figure 3:
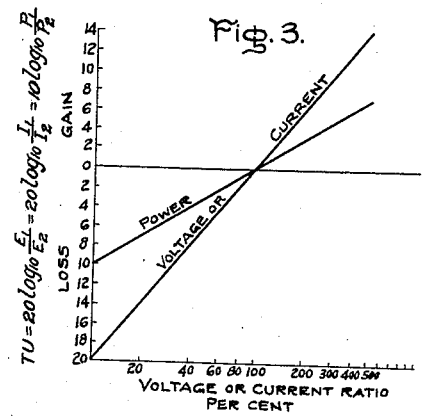

In the drawings, Fig. 1 is a wiring diagram of a testing apparatus embodying the invention; Fig. 2 is a curve diagram showing the operation of one of the electric discharge devices represented in Fig. 1; and Fig. 3 is a curve diagram showing the range of control of the apparatus shown in Fig. 1.

Referring to Fig. 1, 5 is a pick-up coil in which voltage from a transmitter may be induced when using the instrument for testing. The coil may be placed externally to the remainder of the apparatus and is connected therewith by suitable leads 6. The pick-up coil is tuned to the carrier frequency of the transmitter by suitable means such as a variable condenser 7. The pick-up coil and the tuning means 7 provide a tuned pick-up or input circuit for the testing apparatus or instrument.

Connected with the tuned input circuit by leads 8 and 9 are a pair of branch or parallel connected circuits 10 and 11. In circuit 10 is connected an audio frequency choke coil 12 and an average current responsive indicating device such as a direct current milliammeter 13. In circuit 11 is connected a direct current blocking means such as a condenser 14 of a capacity such that it is adapted to convey alternating current of a low or audio frequency, and an impedance 15 in the form of a tapped resistor across which a flow of audio frequency current through circuit 11 sets up alternating current voltage. This circuit may also include a device 16 for indicating the value of the alternating or audio frequency current in circuit 11.

Interposed between the junction of the parallel branch circuits 10 and 11 and the tuned input circuit for the apparatus is a rectifier device 17 and means providing a tuned trap circuit 18 in series with a resistor 19. The trap circuit includes suitable tuning means which in the present example are indicated as a fixed coil or inductance 20 and a shunt variable condenser 21.

In the arrangement of the present example which is the preferred arrangement of the apparatus, the tuned trap circuit 18 and the resistor 19 are inserted in one lead, 9, while the rectifier or detector 17 is inserted in the other lead 8. The latter lead may be considered to be the low potential or ground side of a circuit including the tuned input circuit and the parallel branch circuits 10 and 11.

The detector 17 includes a cathode 22 and an anode 23 and is a two-element rectifier device, which is the preferred type of rectifier device in an apparatus of this character. The cathode of the rectifier is heated by suitable means such as a battery 24. In series with the battery is a suitable filament control rheostat 25 and in shunt therewith is a potentiometer 26 through which the low potential end of circuit 11 is returned to lead 8, said low potential end being connected with a moving contact 27 on the potentiometer.

Following the rectifier 17 and not including the tuned circuit 18 and resistor 19, is a reservoir condenser 28 shunted across leads 8 and 9 whereby it receives and stores energy from the input circuit after being rectified by device 17.

With this arrangement, current from a transmitter may be induced in pick-up coil 5 and the tank circuit 5, 6, 7 which is tuned to the frequency of the transmitter. Current from the tank or tuned circuit is supplied through the rectifier tube into the reservoir condenser 28. The condenser 28 becomes charged on the peak current and sustains its charge practically throughout the negative half cycle. The output of the rectifier is thus assured of being a smooth envelope of the input radio frequency.

Any carrier frequency which is carried over through the rectifier to leads 8 and 9 is trapped out by the tuned trap circuit 18. The resistor 19 serves to limit the load which is placed on the tuned input circuit, and also assures that the output of the rectifier will be a linear function of the input.

From the foregoing description it will be seen that the radio frequency or carrier current which is picked up in the tuned input circuit and rectified in device 17, is supplied through tuned trap circuit 18 and resistor 19 to a pair of branch or parallel circuits 10 and 11, one of which, 10 has a low impedance to the direct current component of the rectified current while the other, 11 has a low impedance to the audio or alternating current component of such rectified current.

The separation of the direct current and audio frequency components of the rectified current is effected in the branch circuits by means of the choke coil 12 and the condenser 14. The choke coil blocks the audio frequency current which tends to flow from lead 8 to 9 through branch 10, and passes the direct current, while the condenser blocks the direct current and passes the audio frequency current through branch 11. The current in the direct current branch is measured in the circuit of the present example, by means of the milliammeter 13 and the current in the audio frequency branch may be measured by a suitable indicating device or milliammeter 16. However, this last is not practicable in the instrument of the present example as will be explained hereinafter.

The current in the direct current branch is proportional to the carrier voltage, therefore, the milliammeter or indicating device 13 in this circuit may be used to indicate whether modulation is more positive than negative. Thus it will serve as a distortion meter.

The resistance of the alternating current or audio frequency branch circuit between leads 8 and 9 is made equal to the resistance of choke coil 12, so that the ratio of the currents in each branch will also be in proportion to the voltage supplied from the input circuit and rectifier 17 between leads 8 and 9.

It is evident that with 100% modulation of the carrier current, the peak values of direct current and audio frequency voltages will be equal, thus the effective audio frequency current as indicated on a milliammeter 16 will be $$\frac{\sqrt{2}}{2}$$

of the direct current. If the two currents are known, percentage modulation can easily be computed by multiplying the audio current measured by milliammeter 16 by $$\frac{\sqrt{2}}{2}$$

and dividing the result by the direct current. If the direct current component is held constant, the percentage modulation is directly proportional to the current in the audio branch. Measuring the direct current in branch 10 is very simple, as a milliammeter of appropriate maximum current rating such as that mentioned, is all that is required.

Measuring the current in the audio frequency branch 11 is more complicated, however, as alternating current milliammeters such as 16 are too sluggish in their action to follow the variations in audio frequency amplitude. Accordingly the impedance or resistor 15 is placed in the audio frequency branch circuit and the voltage drop across it is impressed upon a suitable vacuum tube voltmeter 29.

The vacuum tube voltmeter of the present example includes a 3-element electric discharge device 30 arranged to receive its filament supply from the same source as the rectifier 17 through lead 8 and ground connections indicated at 31—31. The grid of the device 30 is provided with a variable tap connection 32 on tapped resistor 15 whereby the alternating current voltage applied to the grid may be varied. This voltage is that existing between lead 8 or low potential side of the branch circuits and the point on resistor 15 to which the grid is connected. The vacuum tube voltmeter is provided with an anode circuit 33 including a source of anode current 34, an indicating device or direct current milliammeter 35 and an audio frequency choke coil 36. The anode circuit is also provided with a suitable by-pass condenser 37.

The current in the alternating current or audio frequency branch 11 is now measured by means of the milliammeter 35 in the plate circuit 33 of the voltmeter tube 30. This tube is preferably one having a high amplification constant and consequent large plate current variation for small variations in grid voltage. This vacuum tube voltmeter must be calibrated in the usual manner as is well known, before it can be used.

As indicated on the diagram, a constant bias potential is supplied to the grid of the voltmeter tube from the filament voltage drop in the potentiometer 26, although it may of course be supplied by any other suitable means. The amount of this bias potential is adjustable by moving the sliding contact 27 of the potentiometer so that it will permit an anode current flow in the voltmeter or indicator circuit 33 sufficient to bring the indicator or milliammeter 35 to an initial or low reading.

In Fig. 2, to which attention is now directed, the curve A—B is a part of the static grid characteristic of the voltmeter tube plotted to an enlarged scale. The point which the indicator 35 reads when adjusted with no modulation (no A. C. grid voltage on the tube) corresponds to 0.2 milliamperes of anode current with a Radiotron UX–841 tube, which is that used at 30 in the circuit represented in the present example. This is point R on the curve and requires four volts of bias to be reached. The line N—N′ is drawn through this point and represents the point about which the grid voltage swings when the vacuum tube voltmeter is excited.

As a test on an apparatus substantially as shown and described, a 60 cycle alternating current voltage was impressed on the grid of device 30 in addition to the direct current bias and adjusted until it caused the plate current to rise from .2 to 1.1 milliamperes. This was measured and found to have a root mean square value of four volts. This corresponds to a peak value of 5.64 volts. A curve 38 of this peak value $E_0=5.64$ is plotted around N—N′ as a zero axis. This wave is produced at 39 on the current axis as a current of maximum value. $I_0$ is read on the curve as 3.5 milliamps. If these were the positive loops of a pure sine wave, the average voltage would be $\frac{1}{2} \times .636$ of the peak value or .318 $I_0$. That is, for a peak value of 3.5 milliamperes the average value of current, as is read on indicator should be 1.113 milliamperes. The current indicated in the anode circuit was 1.10 milliamperes. Thus the static and constructed dynamic characteristics agree remarkably well, showing that the vacuum tube as applied in this instrument is independent of frequency, even though the frequency be carried very high. The slight difference in results are probably due to the divergence from true sine wave loops of the plate current curve.

Two courses are open in arranging the tube voltmeter in this instrument. One is to tap the grid lead from a fixed point of the resistor 15 and to read audio frequency current on the indicator or milliammeter 35. The other is to make this point variable as shown and hold the anode current of the voltmeter tube 30 constant. The latter method is preferred, as it allows the indicator or meter 35 to be operated over the more accurate portion of its scale.

In this arrangement, since the grid voltage is always adjusted for the same anode current, the grid voltage swing is the same at all percentages of modulation within the range of the indicator, when the tapped resistor 15 is properly adjusted. The RI drop in the resistor 15 between the grid and ground thus being constant, the current will vary inversely as the resistance included by the tap.

The resistances to be included between each tap and low potential lead 8 are calculated in the following manner: (Assuming the current in the direct current branch 10 to be held constant at ten milliamperes for example,) the currents in the audio frequency branch at each even TU between −12 and 2, are computed. These values of current are then divided into the alternating current voltage required to raise the current in the anode circuit 33 of voltmeter tube 30 to 1.1 milliamperes which has previously been measured and found to be four volts. These values of resistances are tapped off the wire-wound tubular resistor 15. In operation, the tap switch 32 is adjusted until the anode current of the tube 30 is at its required value and the TU up or down is determined from the position of the tap switch. This switch may be arranged to read percentage modulation directly in steps, such as ten per cent steps, but it is advantageous to have it operate on integral TU's so that it may be similar to audio control apparatus.

A curve for converting TU up or down to percentage modulation or vice versa is shown in Fig. 3. From this curve which is self explanatory, it can be seen that the range covered by seven taps as indicated in Fig. 1, from −12 TU to 2 TU, corresponds to a percentage modulation range of from 25% to 125%.

The modulation indicator is adapted to be built of standard parts and mounted in a control rack of a transmitter as one of the units thereof. It is compact and the only external part is the pick-up coil, which may be of small dimensions. Having only meters, switches, and dials in its construction, it may be made to conform to the general appearance of any station control apparatus.

The cost is much less than that of the oscilloscope which has heretofore been used. Repairs may be made as on any of the remote control equipment whereas it requires considerable skill to repair the vibrator of an oscilloscope.

The indicator may serve five purposes; that of monitoring, indicating percentage modulation, taking frequency and amplitude characteristics, and indicating variation in the carrier during modulation (that is, unsymmetrical modulation). Taken as a whole, the indicator or testing instrument is cheaper, more accurate for monitoring and a smaller and more practical means of measuring percentage modulation than is the oscilloscope.

What I claim as new and desire to secure by Letters Patent of the United States, is:

1. An electrical apparatus adapted for testing the modulation of a radio transmitter, said apparatus including a tuned input circuit comprising a pick-up coil and means for tuning said coil to a desired frequency, a pair of branch circuits connected in parallel with said tuned input circuit, one of said branch circuits including an audio frequency choke coil and a direct current milliammeter connected in series, the other of said circuits including a blocking condenser and a potentiometer connected in series, a tuned trap circuit and a resistor connected in series between one junction of said branch circuits and said tuned input circuit, a rectifier device connected between the other junction of said branch circuits and said tuned input circuit, and a vacuum tube voltmeter including an electric discharge device having a grid provided with a variable connection to said potentiometer, means providing a variable bias voltage for said electric discharge device, and an anode circuit for said device including an audio frequency choke coil, a direct current milliammeter and a source of anode current, said milliammeter and said potentiometer being calibrated to indicate a comparison of the audio frequency and direct current components of current supplied from said input circuit through said rectifier device to said branch circuits.

2. A testing instrument for a radio transmitter including an input circuit, means for tuning said input circuit to a desired frequency, a direct current branch circuit, an audio frequency branch circuit, indicating means for reading current flow in said direct current circuit, a vacuum tube voltmeter for reading current flow in said audio frequency branch circuit, a variable resistor in said audio frequency circuit for applying voltage to said vacuum tube voltmeter, and a tuned trap circuit and a rectifier device inserted in circuit between said branch circuits and said tuned input circuit.

In witness whereof, I have hereunto set my hand this 20th day of August, 1929.

ANDREW D. RING.